United States Patent [19]

Iten

[11] Patent Number: 4,817,771
[45] Date of Patent: Apr. 4, 1989

[54] SPRING CLUTCH WITH ENGAGEABLE FIRST AND SECOND HELICAL CLUTCH SPRINGS

[75] Inventor: Peter Iten, Staefa, Switzerland

[73] Assignee: Baumann & Cie AG, Rüti, Switzerland

[21] Appl. No.: 44,497

[22] PCT Filed: Jul. 8, 1986

[86] PCT No.: PCT/CH86/00095
§ 371 Date: Mar. 16, 1987
§ 102(e) Date: Mar. 16, 1987

[87] PCT Pub. No.: WO87/00594
PCT Pub. Date: Jan. 29, 1987

[30] Foreign Application Priority Data
Jul. 19, 1985 [CH] Switzerland .................. 3157/85

[51] Int. Cl.$^4$ .................. F16D 13/08; F16D 67/02
[52] U.S. Cl. .................. 192/16; 192/12 BA; 192/17 D; 192/36; 192/81 C
[58] Field of Search .................. 192/12 BA, 17 D, 36, 192/26, 16, 81 C

[56] References Cited

U.S. PATENT DOCUMENTS

| | | | |
|---|---|---|---|
| 1,932,000 | 10/1933 | Starkey | 192/81 C X |
| 1,934,790 | 11/1933 | Brownlee | 192/81 C X |
| 2,302,312 | 11/1942 | Greenlee et al. | 192/81 C X |
| 2,336,757 | 12/1943 | Starkey | 192/81 C X |
| 2,878,914 | 3/1959 | Worst | 192/81 C |
| 2,951,568 | 9/1960 | Hungerford et al. | 192/81 C |
| 2,971,394 | 2/1961 | Christensen | 74/377 |
| 3,048,050 | 8/1962 | Perryman | 192/12 BA |
| 3,529,703 | 9/1970 | Kroeker | 192/81 C X |
| 4,418,811 | 12/1983 | MacDonald | 192/81 C |

FOREIGN PATENT DOCUMENTS

| | | |
|---|---|---|
| 456656 | 2/1928 | Fed. Rep. of Germany . |
| 3105044 | 2/1982 | Fed. Rep. of Germany ... 192/17 D |
| 2795 | of 1914 | United Kingdom . |
| 679245 | 9/1952 | United Kingdom . |
| 898183 | 6/1962 | United Kingdom . |

Primary Examiner—Rodney H. Bonck
Attorney, Agent, or Firm—Watson, Cole, Grindle & Watson

[57] ABSTRACT

A spring clutch includes a driving hub attached to a drive shaft, a driven hub to which a mass to be rotated is attached, and first and second helical clutch springs which are engageable to interconnect the driving hub and the driven hub, the first helical clutch spring including a first portion of smaller diameter which is in preloaded contact with the driven hub and a second portion of larger diameter which has a radially outwardly-extending end, and the second helical clutch spring being in preloaded contact with the driving hub and including a radially outwardly-extending end. A rotatable clutch sleeve is connected to the end of the first helical clutch spring and is movable by a pivot lever to interconnect the end of the first helical clutch spring with the end of the second helical clutch spring so that rotation of the second helical clutch spring will cause rotation of the first helical clutch spring and thus the driven hub.

6 Claims, 2 Drawing Sheets

SPRING CLUTCH WITH ENGAGEABLE FIRST AND SECOND HELICAL CLUTCH SPRINGS

BACKGROUND OF THE INVENTION

The present invention relates to a spring clutch having a driving hub and a driven hub, the driven hub being rotated by the driving hub only when the clutch is engaged, and also including a spring coaxially fitted between the two hubs for torque transmission, and a clutch sleeve for the operation of the transmission.

Spring clutches are most frequently used as shifting clutches which, as a rule, are engaged and disengaged by way of an electromagnetically or mechanically-activated lever and a cam sleeve which interacts with the lever. Mostly, a transmission link is briefly interrupted when the clutch spring is opened by immobilizing the cam sleeve, thereby interrupting the transmission link between the driving hub and the driven hub. For this type of spring clutch with driving hub and driven hub normally standing in constant transmission link, the use of a helical spring results in a very simple construction. If, however, the opposite is the case and the transmission link is supposed to be present only when the clutch is activated, one can no longer make do with the simple constructional principle for such a spring clutch.

The present invention has to do with a spring clutch of the latter-named type, in which the transmission link is realized only during activation.

From GB-PS No. 898,183 a spring clutch is known which has a clutch sleeve surrounding the helical clutch spring, this sleeve, when the transmission link of the spring clutch is separated, being rotated by means of the helical clutch spring, which is applied with a segment with pre-loading against the drive hub and with another segment applied on the inside against the clutch sleeve. On the exterior circumference of this sleeve a helical control spring is fitted which rotates with the clutch sleeve, this control spring including an angled end which runs up against a radially displaceable activation lever so that by means of the clutch sleeve, which is held back by the control helical spring, the helical clutch spring is closed and the transmission link is established. The decisive disadvantage of this construction, however, consists in the fact that due to the form-closure between the spring and the clutch sleeve, friction and therefore wear-and-tear result between the sleeve and the control helical spring which sits on its perimeter while being held firmly by the activation lever during the starting phase, so that normally disengaged type spring clutch is suitable only for short starting phases and certainly not for high rates of revolution.

SUMMARY OF THE PRESENT INVENTION

The object of the present application therefore consisted in creating a spring clutch which would be suitable for long starting phases without the incidence of abrasion due to friction, and which therefore would also be suitable for high rates of revolution. Moreover, a goal to be achieved at the same time was one where, when the transmission link is de-coupled, the driven hub and the mass set into rotation by it becomes slowed down by braking action—which, namely, is not possible with the prior art spring clutch. This is achieved in the transmission according to the invention by means of a helical clutch spring which consists of two segments with diameters of different sizes, a partial length of one segment being in gripping contact with preloading when the clutch is disengaged, its external circumference being applied on the inside surface of a housing bore.

The advantage of the spring clutch according to the invention consists in the fact that engagement of the clutch is not achieved by immobilizing an additional spring by means of an abutment, but that an additional spring which is present likewise is secured with preloading to turn with the drive hub, and is constantly rotating, and is only opened for a short time during the starting phase of engagement by running up against the carrier piece of the clutch sleeve, thereby slipping through until the fixed friction torque of the slipping-through action succeeds in achieving full entrainment, while subsequently no relative motion of parts is present which can cause friction and abrasion. For this reason the spring clutch can be engaged as long as it is desired. First and foremost, however, this spring clutch allows engagement at a significantly higher rate of revolution than is possible with the known spring clutches of this kind. If with a known clutch a certain mass to be driven can be entrained at a maximum rate of 200 revolutions per minute, then the spring clutch according to the invention makes entrainment of the same mass possible at a rate of revolution of 3000 revolutions per minute or even higher.

Further advantages and particulars of the invention will become apparent from the following description and the illustrations, in which is represented an embodiment form of the subject of the invention in a purely exemplary manner.

DETAILED DESCRIPTION OF THE PREFERRED EMBODIMENT

Figure 1:
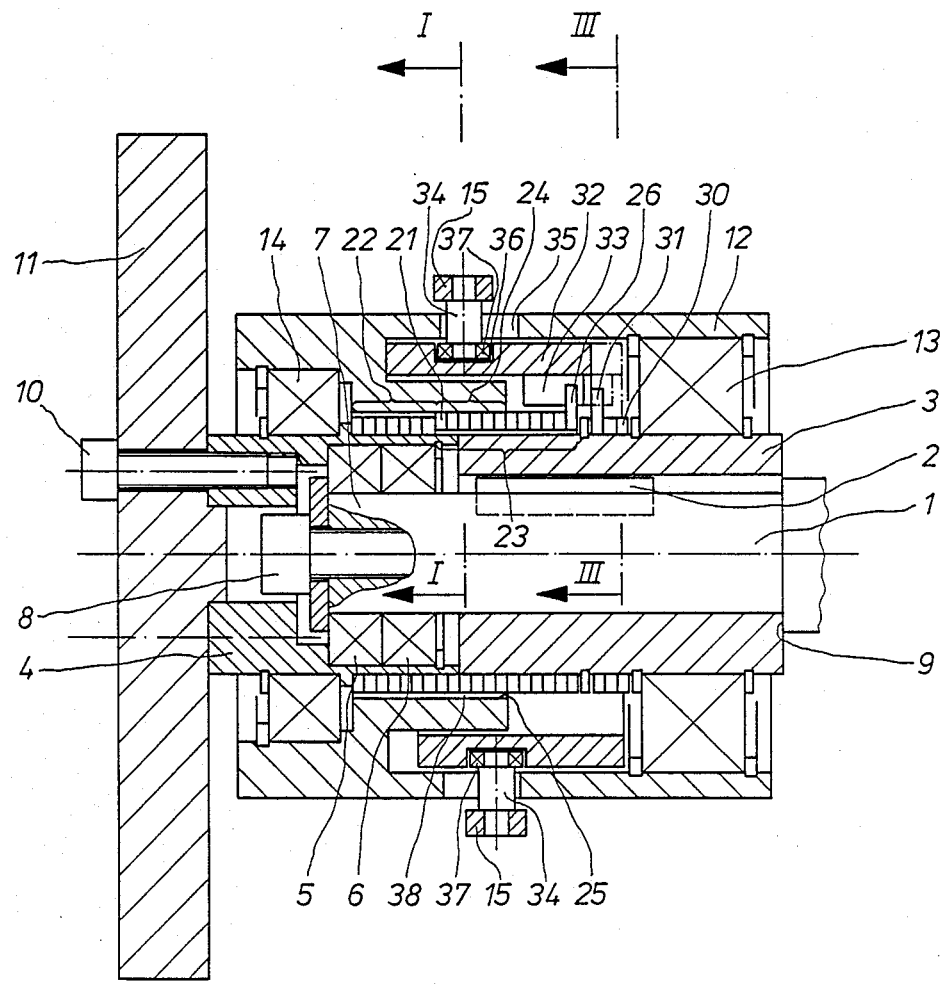
FIG. 1 is an axial cross-section through a spring clutch according to a preferred embodiment of the present invention, the cross section being as seen along line II—II in FIG. 2, the upper half of the figure showing the disengaged condition and the lower half the engaged condition.
Figure 2:
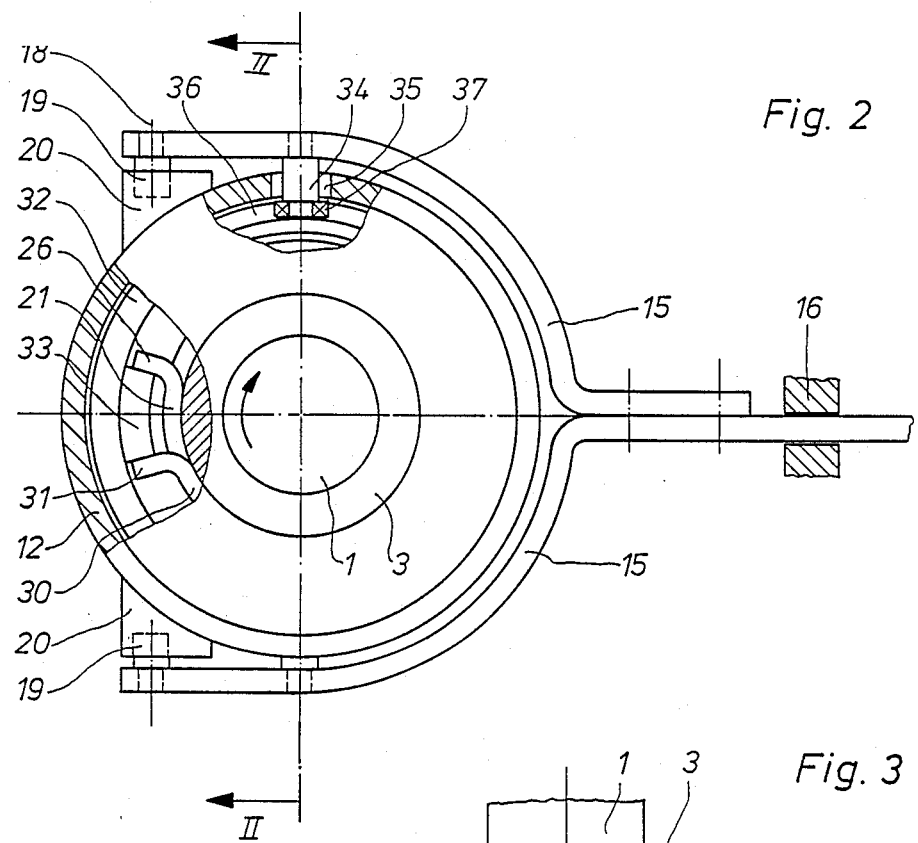
FIG. 2 is a partial diagonal cross-section with reference to line I—I and with reference to line III—III in FIG. 1.
Figure 3:
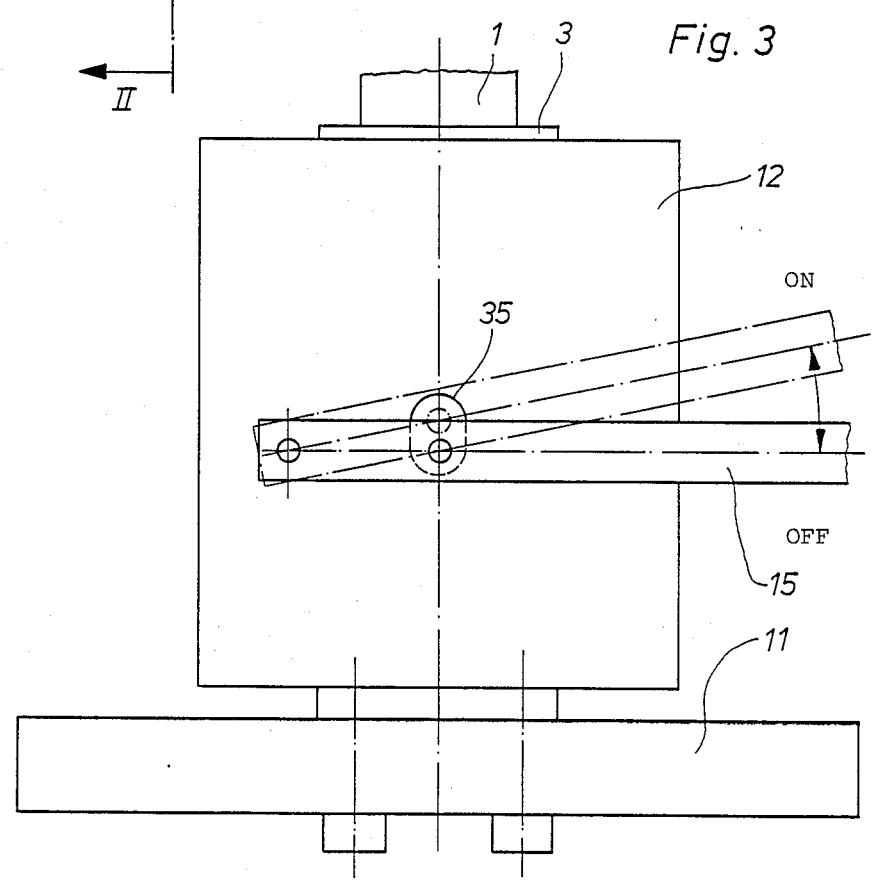
FIG. 3 is a bottom plan view of the spring clutch shown in FIG. 1.

The inventive spring clutch, as seen in FIGS. 1-3, has a drive shaft 1 on which a driving hub 3 is mounted by means of a cotter 2. A driven hub 4 is affixed to the end segment 7 of the drive shaft 1 by means of two antifriction bearings 5 and 6. By means of a screw 8 the driving hub 3 and the driven hub 4 are held in an axial direction by abutting against the collar 9 of the drive shaft 1, whereby the necessary clearance between the driving hub 3 and the driven hub 4 is present. The mass 11 to be driven is affixed to the driven hub 4 by means of screws 10.

A clutch housing 12 is set on the driving hub 3 and the driven hub 4 by means of the two antifriction bearings 13 and 14. The clutch housing 12 is reinforced against rotation by means of an activation lever 15, more recognizable in FIG. 2, which encompasses it diagonally to the longitudinal axis of the clutch. The activation lever extends through guide 16 so that the activation lever can move back-and-forth and pivot around an axis of rotation 18 which runs through the end of the lever. The swivel-pins 19 rotate in pivotings 20 firmly set on the clutch housing 12. The function of the activation lever 15 is described further on below.

A helical clutch spring 21 encloses the driving hub 3 and the driven hub 4 and has two segments 22,23 of smaller and longer diameters, respectively. Segment 22 of the helical clutch spring 21 is applied with great pre-loading against the driven hub 4 (at its left end in FIG. 1). The inner diameter of the segment 23 is larger than the outer diameter of the driving hub 3 and of the driven hub 4. A partial length 24 of segment 23 lies with pre-loading on the inside against a housing bore 25 in the clutch housing 12, as long as engagement between the driving hub 3 and the driven hub 4 is not established, and/or this partial length 24 of the clutch spring 21, after the engaged condition is ended (the engaged condition is represented in FIG. 1 in the lower half) is applied once again against the housing bore 25, whereby the clutch spring is slowed down by braking action.

The helical clutch spring 21 has a spring end 26 angled radially outward (at its right end in FIG. 1). The other end of the clutch spring 21 is applied to the driven hub 4 with pre-loading in the axial direction. An additional helical spring 30 is positioned in the housing and is applied to the driving hub with pre-loading, which spring 30 has a spring end 31 angled radially toward the outside. The coiling direction of this spring is opposite to the coiling direction of the clutch spring 21. Furthermore, in the clutch housing 12 is mounted a clutch sleeve 32 which is positioned so that it can be moved back-and-forth in an axial direction as well as rotated and which, on its interior, has a cam-shaped carrier piece 33. This carrier piece 33 reaches into the area of the outwardly-angled spring end 26 of the clutch spring 21, i.e., the spring end 26 rests against the carrier piece 33. The back-and-forth movement of the clutch sleeve 32 takes place by means of the aforementioned activation lever 15 which supports two bolts 34 which are arranged diametrically opposite one another and face the axis of the clutch. Each bolt 34 extends through a slit 35 formed as a slotted hole in the housing 12 and extends into an annular tee-slot 36 formed on the external periphery of the clutch sleeve 32 and each bolt 34 supports an antifriction bearing 37 on the bolt end because the bolt 34 remains stationary and the clutch sleeve 32 moved by it rotates with the driving hubs rate of revolutions when the clutch is engaged.

When the clutch sleeve 32 is shifted by the pivotable activation lever 15 from the position represented by solid lines in the upper half of FIG. 1 toward the right and into the position represented by dotted lines, the carrier piece 33 moves into the circular path of the spring end 31 of the additional helical spring 30, while the carrier piece 33 permanently is in abutting contact with the spring end 26 of the clutch spring 21, as may be seen from FIG. 1 and FIG. 2. By means of this form-locking connection of the two spring ends, the clutch spring 21 becomes closed and, thereby, the driving hub 3 is frictionally engaged with the driven hub 4, as represented in the lower half of FIG. 1. Simultaneously, between the housing bore 25 and the partial length 24 of the clutch spring 21, a clearance 38 results, as is the case along the subsequent segment 22 of the clutch spring 21.

In order that engagement in the previously described way at a high rate of revolution not take place in sudden bursts, the additional spring 30 must be laid out in such a way that it can close the clutch spring 21, and then slip through until the constant friction torque of the slipping through has successfully achieved full engagement. Because, as has already been mentioned, the two clutch springs 21 and 30 have opposite coil directions, the clutch spring 21 becomes closed while the additional spring 30 opens to the extent that it slips through.

As long as the carrier piece 33 of the clutch sleeve 32 links the two spring ends 26 and 31 in a form-locking manner, the driven hub 4 remains linked with the driving hub 3 by way of the clutch spring 21. When the clutch sleeve 32 is once more shifted back toward the left and into the position represented by solid lines, the closure moment on the spring end 26 of the clutch spring 21 is lacking, so that it once again adopts the posture represented in the upper half of FIG. 1 whereby it is slowed down with a braking action in the area of the partial length 24 of the clutch spring in the housing bore 25. The driven hub 4 with the mass 11 to be driven affixed on it rotates, however, as a result of the great inertia moment, even further, and is braked by means of the friction torque of the clutch spring 21 in the segment 22 of this spring. The braking time may thereby be established in the simplest manner by the choice of pre-loading of the clutch spring 21.

The spring clutch according to the invention is especially suitable for drives with high rates of revolution and with a high inertia moment present, for example for the blade drive of a lawn mower driven by means of a combustion motor. For the blade drive, a dead man switch can be accomplished with the pivotable lever 15 for switching on and off, due to which, by virtue of releasing the control rod of the mower, the blade comes to a standstill in a very short time while the motor continues to run.

I claim:
1. A spring clutch which comprises
a housing,
a driving hub rotatably mounted with respect to said housing,
a driven hub rotatably mounted with respect to said housing, said driving hub and said driven hub being axially aligned within said housing,
a first helical clutch spring mounted within said housing, said first helical clutch spring having a first portion which surrounds a portion of said driven hub and is in pre-loaded contact with said driven hub and a second portion which surrounds a first portion of said driving hub, said second portion, when in an unextended condition, providing an annular space between it and said driving hub, said second portion including a radially outwardly-extending end portion,
a second helical clutch spring mounted within said housing so as to surround a second portion of said driving hub, said second helical clutch spring being in pre-loaded contact with said driving hub, said second helical clutch spring including a radially outwardly-extending end portion, and
an axially-movable clutch sleeve rotatably mounted within said housing and connected to said end of said second portion of said first helical clutch spring, axial movement of said clutch sleeve being capable of moving said end of said second portion of said first clutch spring into locking contact with said end of said second clutch spring, such that rotation of said second clutch spring by said driv- ing hub will result in rotation of said first clutch spring and thus said driven hub.

2. A spring clutch according to claim 1, wherein the coiling direction of said first helical clutch spring is opposite to the coiling direction of said second helical clutch spring, such that said second helical clutch spring will open when said end of said second portion of said first helical clutch spring engages said end of said second helical clutch spring.

3. A spring clutch according to claim 1, wherein said first portion of said first helical clutch spring has a smaller diameter than said second portion thereof when in an unextended condition.

4. A spring clutch according to claim 1, wherein said second portion of said first helical clutch spring, when in an unextended condition, contacts a portion of said housing to provide a braking action on the rotation of said first helical clutch spring and thus said driven hub.

5. A spring clutch according to claim 1, wherein said clutch sleeve includes an annular slot in an outer periphery thereof, wherein said housing includes two diametrically opposed openings therein, and wherein a pivot lever is pivotally attached to said housing, said pivot lever including separate bolts which extend through said openings in said housing and into said annular slot in said clutch sleeve, and first bearings attached to said bolts to enable said clutch sleeve to rotate relative to said bolts, pivotal movement of said pivot lever causing axial movement of said rotating clutch sleeve.

6. A spring clutch according to claim 1, including a drive shaft extending into said housing and to which said driving hub is attached, wherein a first pair of bearings are positioned between said drive shaft and said driven hub, and wherein a second pair of bearings are positioned between said driven hub and said housing and said driving hub and said housing respectively.

* * * * *